(No Model.)

M. A. SLATTER.
BED PAN.

No. 601,084. Patented Mar. 22, 1898.

UNITED STATES PATENT OFFICE.

MARY A. SLATTER, OF LECKHAMPTON, ENGLAND.

BED-PAN.

SPECIFICATION forming part of Letters Patent No. 601,084, dated March 22, 1898.

Application filed November 2, 1897. Serial No. 657,171. (No model.)

*To all whom it may concern:*

Be it known that I, MARY ANN SLATTER, a subject of the Queen of Great Britain, residing at Leckhampton, in the county of Gloucester, England, have invented certain new and useful Improvements in Bed-Pans and the Like, of which the following is a full, clear, and exact description.

My invention relates to a receptacle for the use of invalids confined to bed, which receptacle may be made either of enameled iron or earthenware, of horseshoe or other shape, and fitted with a hollow handle serving as an outlet. According to my invention I form such receptacle with a grooved rim and fit the latter with an inflated rubber tube or cushion, which may be provided with a suitable cover or otherwise strengthened and fitted with an air-valve. In the hollow handle I place a vessel or hollow stopper filled with disinfectant and provided with a valve or stopper in its bottom to enable the disinfectant to be discharged into the receptacle. Such hollow stopper or vessel may also serve as a disinfecting vessel for the room.

My invention is illustrated in the accompanying drawings, in which—

Figure 1:
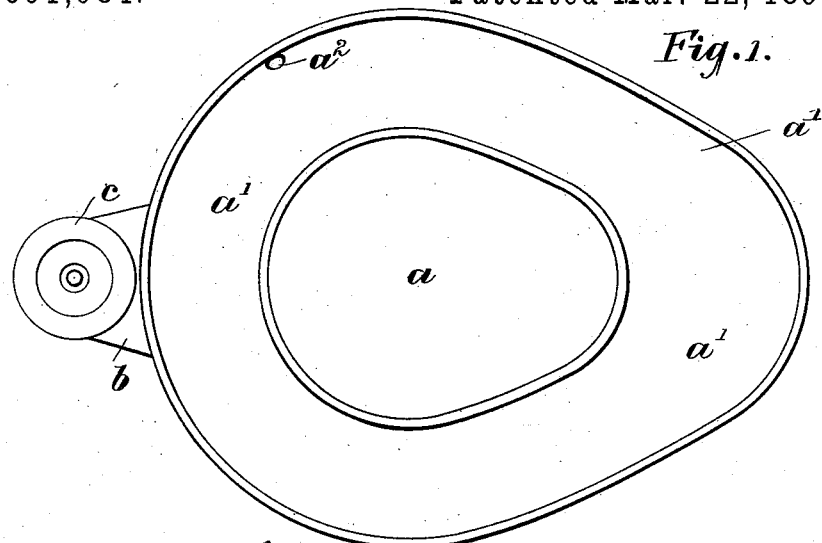
Figure 3:
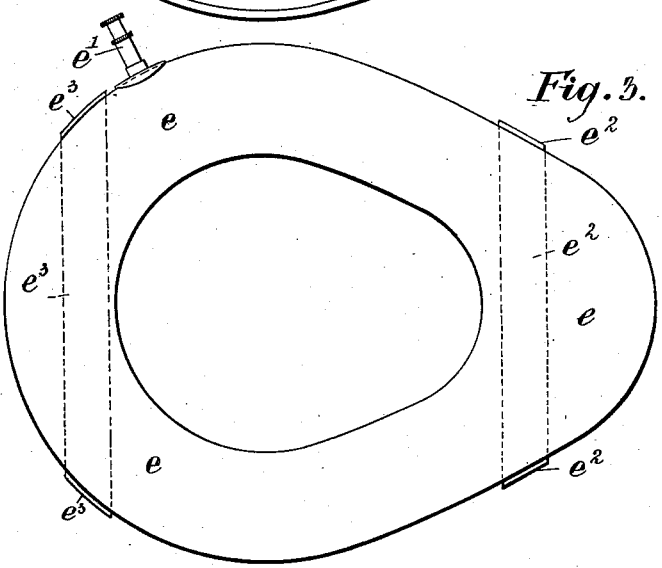
Figure 2:
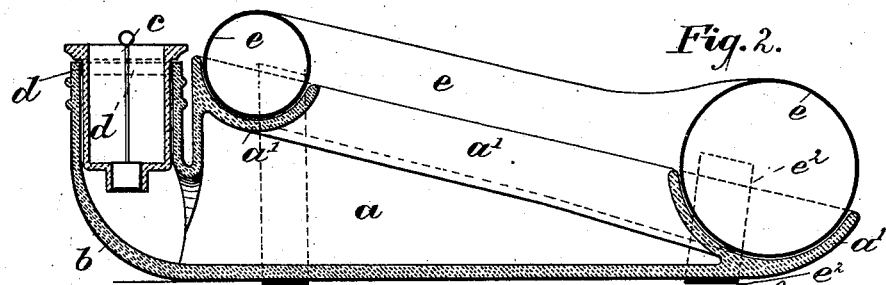

Figure 1 is a plan of a bed-pan, showing the rim for receiving the air tube or cushion. Fig. 2 is a longitudinal section of the bed-pan, showing the air-cushion in position; and Fig. 3 is a plan of the air-cushion separately.

*a* is the body of the bed-pan.

*b* is the outlet tube or arm, which is shaped to receive a plug or stopper *c*. This plug or stopper is preferably made of china or earthenware and hollow, while in order to make it air-tight I use in connection therewith an india-rubber ring or washer *d*, placed around the same immediately below the head thereof. This hollow stopper or vessel is provided with an aperture in its bottom, which may be fitted with a stopper, as shown, or with any suitable kind of valve to enable the contents to be discharged into the pan when required.

Surrounding the opening in the pan is a grooved or hollow rim $a'$ of suitable depth and width to receive the air tube or cushion *e*, which latter is made in any well-known manner and is provided with an air-valve $e'$ and bands $e^2$ $e^3$, preferably of india-rubber. In placing and securing the air tube or cushion in position the bands $e^2$ $e^3$ are passed underneath the pan, and the air-valve $e'$ is passed through a hole $a^2$, formed in the grooved or hollow rim $a'$.

Having fully described my invention, what I claim, and desire to secure by Letters Patent, is—

In a bed-pan or the like, the combination of a grooved or hollow rim surrounding the opening therein, an air-inflated tubular cushion provided with an air-valve and located on said rim, and an outlet tube or arm fitted with a hollow stopper provided with a valve or stopper, substantially as herein set forth.

In testimony whereof I affix my signature in presence of two witnesses.

M. A. SLATTER.

Witnesses:
 ROBT. LEY WOOD,
 P. S. PROSSER.